US011749276B2

(12) United States Patent

Brandel et al.

(10) Patent No.: US 11,749,276 B2

(45) Date of Patent: *Sep. 5, 2023

(54) VOICE ASSISTANT-ENABLED WEB APPLICATION OR WEB PAGE

(71) Applicant: Microsoft Technology Licensing, LLC, Redmond, WA (US)

(72) Inventors: Rene Huangtian Brandel, Seattle, WA (US); Jason Eric Voldseth, Campbell, CA (US); Biao Kuang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/504,733

(22) Filed: Oct. 19, 2021

(65) Prior Publication Data

US 2022/0059091 A1 Feb. 24, 2022

Related U.S. Application Data

(63) Continuation of application No. 16/457,720, filed on Jun. 28, 2019, now Pat. No. 11,183,188.

(51) Int. Cl.

| | |
|---|---|
| ***G10L 15/22*** | (2006.01) |
| ***G06F 3/16*** | (2006.01) |
| ***G06F 8/41*** | (2018.01) |
| ***G10L 15/30*** | (2013.01) |

(52) U.S. Cl.

CPC .............. *G10L 15/22* (2013.01); *G06F 3/167* (2013.01); *G06F 8/44* (2013.01); *G10L 15/30* (2013.01); *G10L 2015/223* (2013.01)

(58) Field of Classification Search

CPC ... G10L 15/22; G10L 15/30; G10L 2015/223; G06F 3/167; G06F 8/44; G06F 9/44521; G06F 9/45529; G06F 9/445

USPC .......................................................... 704/201

See application file for complete search history.

(56) References Cited

U.S. PATENT DOCUMENTS

2008/0255851 A1* 10/2008 Ativanichayaphong .................... G06F 3/16 704/275

2018/0130464 A1* 5/2018 Haviv .................... G06F 3/167

* cited by examiner

*Primary Examiner* — Charlotte M Baker

(57) ABSTRACT

Various embodiments discussed herein enable applications to seamlessly contribute to executing voice commands of users via voice assistant functionality. In response to receiving a user request to open an application or web page, the application can request and responsively receive a voice assistant runtime component along with the application or web page. The application, using a particular universal application interface component can compile or interpret the voice assistant runtime component from a source code format to an intermediate code format. In response to the application or web page being rendered and the detection of a key word or phrase, the application can activate voice assistant command execution functionality. The user can issue a voice command after which the application along with specific services can help execute the voice command.

20 Claims, 9 Drawing Sheets

VOICE ASSISTANT-ENABLED WEB APPLICATION OR WEB PAGE

CROSS-REFERENCE TO RELATED APPLICATIONS

This application is a continuation application of U.S. patent application Ser. No. 16/457,720, filed Jun. 28, 2019, the entire disclosure of which is hereby incorporated herein by reference.

INTRODUCTION

Users often rely on voice-enabled digital assistants (voice assistants) to carry out various tasks. For example, a user can issue a "wake word," which triggers activation of a smart speaker to listen for a command. The user may then issue a voice command or request, such as a natural language request to play a particular song or activate a home device among other things. The smart speaker may then transmit the command to a voice recognition service and/or skill service to execute the command according to its skill capabilities.

Voice assistants are typically driven by specific platforms, such as specific operating systems or hardware devices (e.g., the INVOKE smart speaker by HARMAND/KARDON and MICROSOFT CORPORATION of Redmond, Wash.). However, some challenges are that it can be tedious to bring these devices everywhere, or a user may be required to download a dedicated local application on his user device to enable the voice assistant to work. Further, voice assistants, and in particular those operating on a client device, generally lack the ability to seamlessly function across any operating system or platform, or seamlessly interface with web applications or web pages.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Various embodiments discussed herein enable client applications, such as communications applications (e.g., MICROSOFT TEAMS) or web browsers (or web applications running within browsers), to operate with a voice assistant, such as by seamlessly executing voice commands of users via voice assistant functionality. In this way, specific platforms, such as particular smart speaker devices, operating systems, browsers, and the like, are not necessary to run a voice assistant. In one example operation, a user is provided a voice assistant service, via a web browser that communicates with a communications platform or service, such that the voice assistant operates with functionality typically only possible where the voice assistant is installed (at least in part locally) on the user device. The voice assistant may be associated with a particular website, web page, web application, or online meeting, or may persist in the user's communications service or browser session across multiple websites visited, online meetings or collaboration sessions, or web applications launched.

In particular, according to an embodiment, in response to receiving a user request to open an application, a client application (e.g., a web browser or communications program) can request and responsively receive a voice assistant runtime component (e.g., a Cortana Software Development Kit written in C) along with the web application page or web page. Alternatively, the voice assistant-runtime is already included in the client application such that it need not be received in response to a request to open a web application or web page. The client application, using a particular universal application interface component (e.g., WebAssembly), can then compile or interpret the voice assistant runtime component from a source code format to an intermediate code format (e.g., binary code of 1s and 0s processed by a virtual processor). The client application may be configured to read the intermediate code for further processing. For example, in response to the client application rendering the web application or web page and the detection of a wake word, the client application can then activate voice assistant command execution functionality (e.g., activate an embedded logical microphone to listen for voice commands). The user can issue a voice command after which the client application, along with specific services, can help execute the voice command.

Existing web technologies and voice assistant technologies have various shortcomings, such as being driven by particular platforms (e.g., devices, operating systems, browsers, applications, or similar platforms), bandwidth issues, and being limited in functionality (e.g., requiring push-to-talk microphone buttons), among other things. Various embodiments of the present disclosure improve these existing technologies by being able to use or be compatible with any suitable platform, increasing bandwidth capacity, and having robust functionality (e.g., removing any push-to-talk requirement functionality).

BRIEF DESCRIPTION OF THE DRAWINGS

The present invention is described in detail below with reference to the attached drawing figures, wherein.

DETAILED DESCRIPTION

Figure 1:
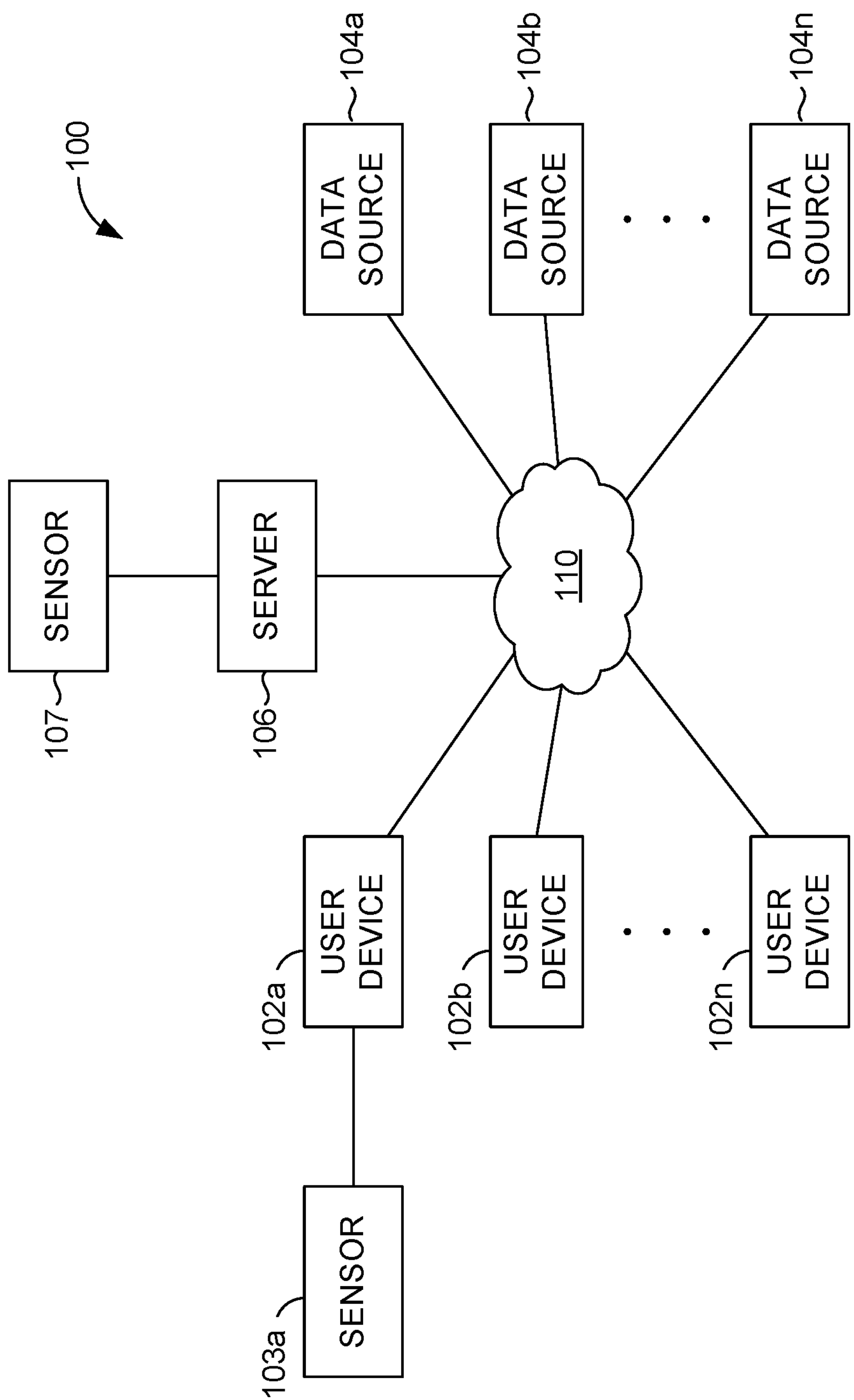
FIG. 1 is a block diagram of an example system, in accordance with some embodiments.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

As used herein, the term "set" may be employed to refer to an ordered (i.e., sequential) or an unordered (i.e., non-sequential) collection of objects (or elements), such as but not limited to data elements (e.g., events, clusters of events, and the like). A set may include N elements, where N is any non-negative integer. That is, a set may include 0, 1, 2, 3, . . . N objects and/or elements, where N is an positive integer with no upper bound. Therefore, as used herein, a set may be a null set (i.e., an empty set), that includes no elements. A set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

Various embodiments described herein enable client applications, such as a web browser (sometimes referred to herein as browser), to help seamlessly execute voice commands of users via voice assistant functionality. This way, specific platforms are not necessary to run voice assistants, such as specific smart speaker devices, operating systems, browsers, and the like. In operation, a user device (e.g., smartphone, tablet, or desktop) can issue a request to access a web application or webpage. For example, a user using the user device can open a web browser from his or her user device and input a particular URL to request a web page of a web application that is offered as a service in a cloud computing platform. In some embodiments, a "client application" need not be a web browser but can alternatively be any suitable application downloaded to a user device used to render content via communication over one or more networks, such as the internet. For example a client application can be a communications program (e.g., SKYPE, MICROSOFT TEAMS, and the like), or a File Transfer Protocol (FTP) application where command-line interfaces are used to connect clients to one or more servers to return, for example, a web page based on the client request. Alternatively, the client application can be an app downloaded (e.g., from an app store) and configured to connect clients to one or more servers via the internet. It is understood, however, that a client application can also be a "web application" and vice versa and that these terms are interchangeable wherever they are recited herein. That is, the same (or portion of) the client application logic can be hosted in a web application. For example, MICROSOFT TEAMS can operate as or include a web application. It is also understood that an "application" can refer to a web application or client application.

In response to receiving a user request, the system can receive a voice assistant runtime component (e.g., Cortana Software Development Kit) with the web application page or web page. A "voice assistant runtime component" as described herein is a component (e.g., a software development kit (SDK)) that has the necessary libraries, communication interfaces, and/or functionality to execute specific voice key words/phrases and voice commands in near-real-time (relative to the time at which the voice command was issued) or in response to a specific key word/voice command issued by a user. For example, a voice assistant runtime component can include one or more of the following: communication interfaces between voice assistant services (e.g., that provide particular skill capabilities) and the client application, audio stack and audio device drivers to detect voice utterances and encode voice commands and/or connect with network protocols to communicate with such services, speech recognition components to recognize key words for activation of the voice assistant, and the like. After receiving the URL request from the user device, the client application can issue a request for the web page or web application (either of which are referred to herein as a "web component") that the user device has specified.

The web component can include or be programmatically hooked into the voice assistant-runtime component as it is returned back to the client application. The client application can then compile or interpret the voice assistant runtimeruntime component (and/or the web component) from a source code format to an intermediate code format that is binary (i.e., code of 1s and 0s). A "source code format" as described herein is a programming language that humans typically write programs in and is the first layer or level of coding to be processed by a system. These languages tend to be the most human-readable languages. For example, the source code format can be in Java, C++, C, C#, Python, JavaScript, Ruby, Rust, Perl, Haskell, and/or any other suitable language. An "intermediate code format" is any coding language this is processed after the source code format but is not directly or natively processed by a particular physical hardware processor (e.g., SPARC, PENTIUM, POWERPC, and the like). This coding tends not to be a programming language that humans write in or easily understand. For example, the intermediate code format can be byte code or virtual machine code that is processed by a virtual processor of a virtual machine. In an illustrative example, an EMSCRIPTEN compiler can compile a voice assistant runtimeruntime SDK from C to WebAssembly bytecode. WebAssembly (WASM) is a set of standards that define WebAssembly bytecode and can run on most web browsers. WASM allows developers to write applications in any source code language, as opposed to being required to write applications in Javascript, which is typically the only language that web browsers execute or understand.

In some embodiments, client applications, such as web browsers, are configured to read the binary intermediate code for further processing. For example, when the web browser renders the web page or web application to the user device using its Document Object Model (DOM) interpreter to display markup HTML for structuring a web page and Cascading Style Sheets (CSS) interpreter to style the web page, it may also activate voice assistant functionality via the compiled or interpreted voice assistant runtime component. Activating the voice assistant runtime component may include turning on key word/phrase detection functionality, which when detected, activates voice command listening functionality. For example, the client application or web component may be configured to detect a key phrase such as “voice assistant.” Accordingly, when this phrase is detected, it can effectively listen or trigger a microphone to initiate recording functionality to encode voice commands of a user.

In an illustrative example, in response to a web component being rendered to a user interface displayed on the computing device, the user may state a key phrase such as “smart assistant.” A web browser, using its compiled or interpreted speech recognition components from the voice assistant runtime component can detect the key word or phrase. Responsively, the web browser can activate a logical microphone that is configured to record and encode any noise above a threshold (e.g., a certain dB level). In some embodiments, the web browser uses WebAssembly to encode the voice command into any suitable standard of a plurality of standards. Encoding as described herein refers to the manner in which data is stored and or transmitted, which typically occurs via a particular standard (e.g., FLAC, LINEAR16, AMR, or other standard). Encoding reconstructs sound using frequency response and dynamic range. Functionality that recreates frequencies is “frequency response” and functionality that creates proper loudness or noise level is “dynamic range.”

In response to the client application transmitting the encoded voice command over a network, one or more computing devices associated with one or more services can process the voice command and retrieve information depending on the skills supported. As described herein, a “skill” or “capability” refers to a voice assistant’s specific ability category for executing voice commands. For example, a first voice assistant skill can be playing music from a first provider, a second skill can be providing weather forecasts, a third skill can be answering questions, a fourth skill can be activating a home device (e.g., lights). Users typically define at least a portion of the skills that voice assistants execute (e.g., via paying for and inputting a skill request via an application) before the voice assistants execute a voice command. Accordingly, voice assistants do not typically execute a voice command unless the voice assistant supports a skill that can execute the voice command, or may request more information from a user if a particular skill cannot be identified.

In an example illustration of the encoded voice command being processed by one or more services, the encoded voice command can be transmitted to a natural language processing (NLP) service that interprets the user’s natural language voice command. Responsively, this service (and/or the user device) can transmit a request to another service (e.g., a music service) to help execute the voice command, which then transmits a payload back to the user device and/or other computing device (e.g., a web server), which causes the request to be executed. In an illustrative example, a user who has opened an email web application that is rendered in a browser can issue a voice command by saying “hey voice assistant . . . bring up every email I sent between 1 p.m. and 2 p.m. yesterday.” The user may be looking for a particular email. This voice command can be encoded and transmitted by the web browser to a NLP service and the web server and/or application server that hosts the web page or web application that is displayed and embedded in the web browser. The web server and/or application server can then cause the web browser to display the emails between 1 p.m. and 2 p.m. within the user device.

In some embodiments, the system can modify or otherwise perform functionality within the web component already opened according to the voice command, such as described above with respect to the email functionality. Alternatively or additionally, the system can perform functionality unrelated to the particular web component that is opened. For example, while the user is interfacing with the email web application, the user can issue a command of “hey smart speaker . . . play X song by Y artist.” The web browser can then encode and transmit this command to a computing device associated with a music service, which causes the X song to be played by Y artist.

Existing smart assistant technologies and web technologies have various shortcomings. For example, as described above, typical voice assistant technologies are driven by specific hardware, operating systems, locally installed applications or other platforms. However, various users may not have specific operating systems or locally installed applications. Moreover, it can be tedious to carry around specific hardware devices to use voice assistant technology all of the time.

Various embodiments of the present disclosure improve these existing technologies by incorporating compilers and/or other components (e.g., WebAssembly) that do not require any particular platform. For example, a source-to-intermediate code compiler or interpreter embedded in a web browser can process any voice assistant runtime SDK written in any source code format using any operating system regardless of the particular device on which the browser is running. Accordingly, the user does not have to use a specific device, such as a smart speaker or any other specific platform. The user, for example, may have lost his device or not brought her device on a trip but may still employ voice assistant functionality using the web on another device, such as a hotel computer. Further, because this technology can run on the web, no locally installed applications are necessarily required. In this way, various embodiments are flexible and are not platform specific.

Existing web technologies are not suitable to employ smart assistant functionality. For example, browsers have historically only supported JavaScript or use complicated plugins for web application functionality. However, a majority of voice assistants today are written in C or other low level languages, making it impossible or difficult to import voice assistant functionality on the web. Moreover, existing voice assistant technology does not allow the same runtime framework to be used on both a voice assistant device and on the web. Under conventional techniques, if developers wanted to import voice assistant functionality (e.g., skills) on the web, the voice assistant runtime would have to be rewritten at least two times—once for the actual voice assistant device (e.g., in C) and another time in JavaScript to enable the web to perform smart assistant functionality. Moreover, both runtimes would have to be kept in synch manually, which is tedious.

Various embodiments of the present disclosure improve these technologies by employing compilers and other runtimeruntime components that can be implemented within a browser that supports any language, such as C. In this way, any voice assistant runtime components can effortlessly be plugged into browsers in order to function on the web. Some embodiments provide the very same voice assistant runtime SDK and services that devices (e.g., smart speakers) use for web applications and/or web pages. Accordingly, any specific skills or capabilities that a device processes for users can be directly imported to the web using the same framework. For example, a user's browser or web component can help execute any command that his or her smart speaker could, using the exact same skills. In this way, developers do not have to re-write code that a device uses to import skills or capabilities on the web. Moreover, separate frameworks do not then have to be manually synchronized.

Existing web technologies may also cause bandwidth problems due to audio encoding standards that particular browsers employ. When a user issues a voice command, typically that voice command gets encoded into one particular standard that the particular browser supports (e.g., FLAC, LINEAR16, AMR, and the like). Encoding into some of these standards, such as FLAC, can cause processing latency, which causes less data to be transmitted over a network per unit of time. Accordingly, bandwidth is affected. As stated above, browsers have historically only supported JavaScript. However, JavaScript does not have enough compute power to encode the audio voice command into any suitable format. Rather, the system has to conform to the encoding that the browser provides.

Some embodiments improve these technologies by encoding audio streams into any suitable format that the voice assistant runtime component provides. In this way, encoding is not limited to any one particular standard. Because voice assistant functionality can require heavy computing, choosing a standard with higher bandwidth capacity is desirable. Accordingly, these embodiments can increase bandwidth capacity.

Existing web or application technologies that understand natural language voice commands are either tedious or do not perform adequate functionality compared to web voice assistant functionality as described herein. For example, some web technologies require push-to-talk functionality (e.g., a microphone button) or other user interface features to perform a voice query search, for example. However, users may not always be in the position to look at a user interface or touch these buttons, such as when they are driving. Some embodiments improve these technologies because they do not require push-to-talk buttons to be selected to activate a microphone. Rather, they include key word detection features that activate or "wake up" a browser/web application/web page to listen for voice commands. Some web technologies include web bots (e.g., chat bots) that can assist users in finding features on the web. However, these technologies are not only backend driven, but they also do not have key word detection capabilities. Nor do these technologies include all of the capabilities or skills that smart assistants perform, such as to activate home devices or execute a particular skill. Various embodiments improve these technologies, as functionality is on the client side (not on the backend) (e.g., provided via browsers or other client applications) and they include key word detection and rich skill capabilities.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a number of user devices, such as user devices 102*a* and 102*b* through 102*n*; a number of data sources (e.g., databases or other data stores), such as data sources 104*a* and 104*b* through 104*n*; server 106; sensors 103*a* and 107; and network 110. It should be understood that environment 100 shown in FIG. 1 is an example of one suitable operating environment. Each of the components shown in FIG. 1 may be implemented via any type of computing device, such as computing device 800 as described in connection to FIG. 8, for example. These components may communicate with each other via network 110, which may include, without limitation, a local area network (LAN) and/or a wide area networks (WAN). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102*a* and 102*b* through 102*n* can be client devices on the client-side of operating environment 100, while server 106 can be on the server-side of operating environment 100. Server 106 can comprise server-side software designed to work in conjunction with client-side software on user devices 102*a* and 102*b* through 102*n* so as to implement any combination of the features and functionalities discussed in the present disclosure. This division of operating environment 100 is provided to illustrate one example of a suitable environment, and there is no requirement for each implementation that any combination of server 106 and user devices 102*a* and 102*b* through 102*n* remain as separate entities. In some embodiments, the one or more servers 106 represent one or more nodes in a cloud computing environment. Consistent with various embodiments, a cloud computing environment includes a network-based, distributed data processing system that provides one or more cloud computing services. Further, a cloud computing environment can include many computers, hundreds or thousands of them or more, disposed within one or more data centers and configured to share resources over the network 110.

In some embodiments, a user device 102*a* or server 106 may include one or more services configured to help execute a voice command of users. For example, these service(s) may comprise: a natural language processing service to understand a voice command, a music provider service to play a song that the user has requested, a weather service to provide current weather conditions the user has requested, a news service that provides the current news the user has requested, and/or a home device activation service that causes one or more home devices (e.g., lights) to be activated in response to a user request. In various instances, each service may correspond to a particular skill supported by a voice assistant.

In some embodiments, a user device 102*a* or server 106, alternatively or additionally, comprise one or more web servers and/or application servers to facilitate delivering web or online content to browsers installed on a user device 102*b*. Often the content may include static content and dynamic content. When a client application, such as a web browser, requests a website or web application via a URL or search term, the browser typically contacts a web server to request static content or the basic components of a website or web application (e.g., HTML, pages, image files, video files, and the like). Application servers typically deliver any dynamic portions of web applications or business logic portions of web applications. Business logic can be described as functionality that manages communication between a user device and a data store (e.g., a database). Such functionality can include business rules or workflows (e.g., code that indicates conditional if/then statements, while statements, and the like to denote an order of processes).

User devices 102*a* and 102*b* through 102*n* may comprise any type of computing device capable of use by a user. For example, in one embodiment, user devices 102*a* through 102*n* may be the type of computing device described in relation to FIG. 8 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104*a* and 104*b* through 104*n* may comprise data sources and/or data systems, which are configured to make data available to any of the various constituents of operating environment 100 or system 200 described in connection to FIG. 2. Examples of data source(s) 104*a* through 104*n* may be one or more of a database, a file, data structure, or other data store. Data sources 104*a* and 104*b* through 104*n* may be discrete from user devices 102*a* and 102*b* through 102*n* and server 106 or may be incorporated and/or integrated into at least one of those components. In one embodiment, data sources 104*a* through 104*n* comprise sensors (such as sensors 103*a* and 107), which may be integrated into or associated with the user device(s) 102*a*, 102*b*, or 102*n* or server 106.

Figure 2:
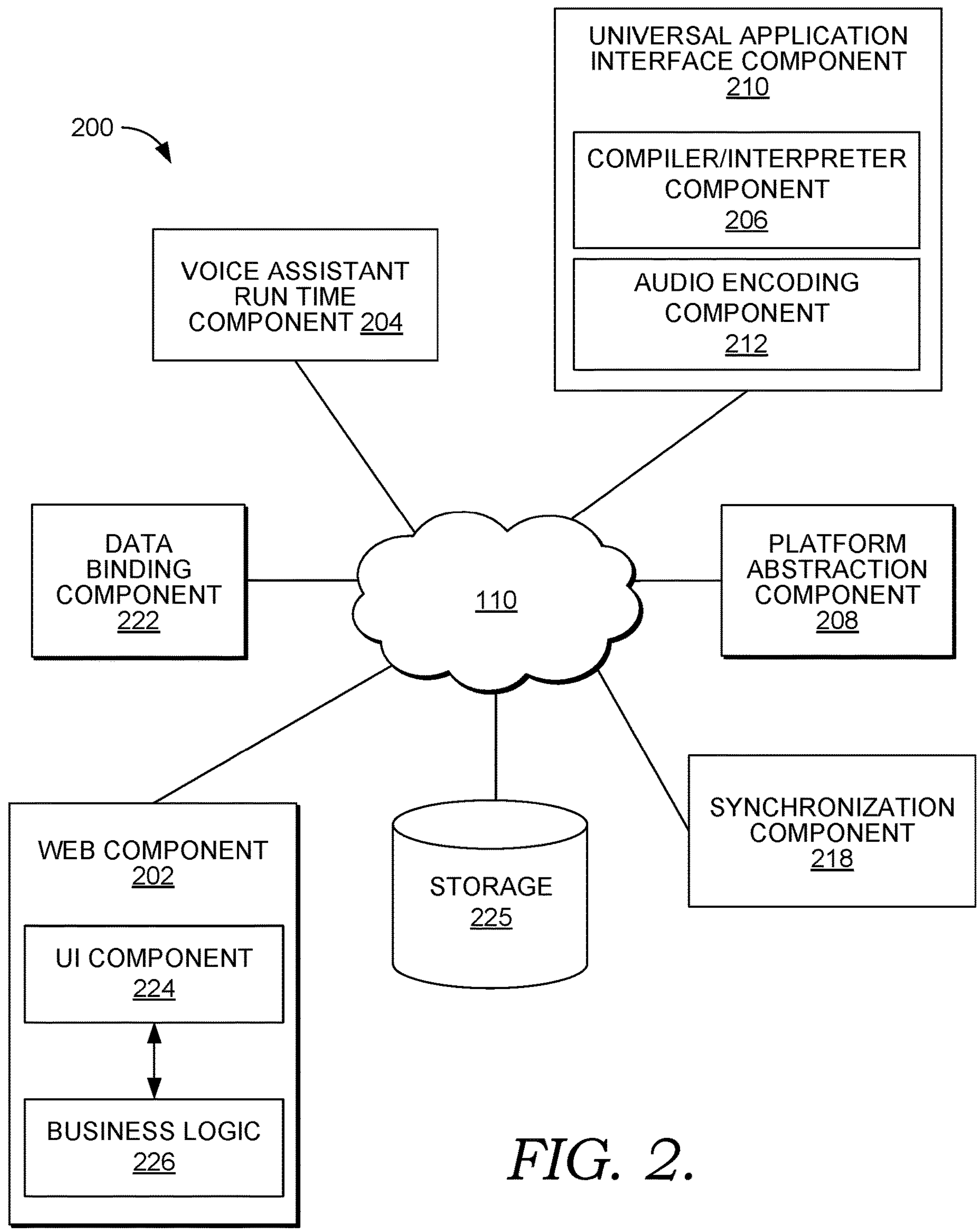
FIG. 2 is a block diagram of an example system, in accordance with some embodiments.

Operating environment 100 can be utilized to implement one or more of the components of the system 200, described in FIG. 2, including components for voice-enabling web applications or web pages. Operating environment 100 also can be utilized for implementing aspects of process flows 400 and 500 described in conjunction with FIGS. 5 and 6, and any other functionality as described in FIGS. 2-8.

Referring now to FIG. 2, in conjunction with FIG. 1, a block diagram is provided showing aspects of an example computing system architecture suitable for implementing an embodiment of the disclosure and designated generally as the system 200. Generally, embodiments of system 200 enable or support running voice assistant functionality on the web. In some embodiments, components of system 200 are built-in and/or run within a browser application operating on or with a user computing device, such as user devices 102*a*-102*n* of FIG. 1. System 200 is not intended to be limiting and represents only one example of a suitable computing system architecture. Other arrangements and elements can be used in addition to or instead of those shown, and some elements may be omitted altogether for the sake of clarity. Further, as with operating environment 100 of FIG. 1, many of the elements described herein are functional entities that may be implemented as discrete or distributed components or in conjunction with other components, and in any suitable combination and location. For instance, the functionality of system 200 may be provided via a software as a service (SAAS) model, e.g., a cloud and/or web-based service. In other embodiments, the functionalities of system 200 may be implemented via a client/server architecture.

As discussed throughout, various embodiments of the present disclosure facilitate voice commands to be executed based on a client application (e.g., a web browser) and/or web component (e.g., a web application) performing certain compiling and/or other functionality as described herein. The web component 202 may comprise a web application, a web page, and/or any portion or component thereof. In various instances, a browser renders (or executes) the web component 202 in response to a user request for the web component 202. For example, a user using the user device 102*a* can issue a request for a particular web application. The corresponding browser within the user device 102*a* can then request the particular web application, and cause the UI component 224 of the web component 202 to be rendered for display to the user device 102*a* as well as process the other components 220 and 222. In some embodiments, the UI component 224 causes a particular presentation content, such as via an "Adaptive Card," which may comprise a visual schema associated with a JSON object, standardizes or facilitates the display of UI content regardless of platform.

In some embodiments, the capability component 220 runs in the web component 202 and includes and/or manages the capabilities (e.g., skills) that the web component 202 supports. This allows the client application (e.g., a web browser) to communicate with the web component 202 to perform a particular skill that involves manipulating the web component 202 in some way (e.g., change a web page, select a button, render information, or perform another operation in response to a voice command). In another example illustration, the capability component 220 can add or remove skills that the web component 202 supports. In some embodiments, the capability component 220 is alternatively or additionally a component of a web browser that communicates with the UI component 224 and/or web browser to modify or otherwise perform functionality (e.g., change web pages) based on the voice command and capabilities.

In some embodiments, the data binding component 222 is hosted in the web component 202 and binds (e.g., via one- or two-way data binding) the UI component 224 of the web component 202 with the business logic 226 of the web component 202. For example, the data binding component 222 can allow a user to manipulate web page or web application elements using a web browser. Thus, if a user inputs data according to the business logic 226, the UI component 224 can cause a presentation to change or otherwise be modified. Alternatively or additionally, in some embodiments the data binding component 222 is a web browser component that binds the web component 202 with the voice assistant runtime component 204. In this way, voice assistant functionality can be combined with web components so that the web browser can execute voice commands.

The voice assistant runtime component 204 includes the libraries, communication interfaces, application programming interfaces (APIs), and/or other components for executing voice commands. For example, the voice assistant runtime component 204 can include a voice assistant runtime SDK (e.g., some or all of the components of the CORTANA SDK). In some embodiments, the voice assistant runtime component 204 includes the following components: communication interfaces (e.g., between user device 102A and the server 106), an audio stack to interface with platform audio device drivers in order to hook into network protocols for communicating with a service (e.g., a music service to execute a music command), speech recognition components to perform key word detection of a word uttered in natural language by a user. Alternatively or additionally, the voice assistant runtime component 204 can include a C-based library that is common to all platforms, audio/speech management components, platform adaptor interfaces (e.g., HTTP/Websocket), audio interfaces, storage interfaces, skills or capabilities, language bindings (e.g., that wraps C shared runtime) that offer support for Java, ObjC, Swift, and the like.

The voice assistant runtime component 204 need not be altered from a device (e.g., smart speaker) to the web. That is, the same voice assistant runtime component 204 can be used both for a specific device and for specific applications across the web. In this way, users can issue, and the system can execute, the same commands from any device, whether that device is a smart speaker, mobile device, tablet, or other computing device. In some embodiments, the web component 202 includes the voice assistant runtime component 204. In this way, when browsers request web applications or pages, they can be returned with the supported voice assistant runtime component 204 hooked into the web applications or web pages.

The universal application interface component 210 receives any source code format input (e.g., C, Java, Ruby, C++, C#, Python, and the like) that web instances are generated in and transforms it into an intermediate code format. In this way, developers can write their applications in any source code language and the client application can process the language without the need of plugins, as opposed to typical browsers that require applications to be written in JavaScript or use arduous plugins. For example, the universal application interface component 210 can be or include WASM, which is a set of standards that define a binary intermediate code format.

The universal application interface component 210 can include a compiler/interpreter component 206 and/or an audio encoding component 212. In some embodiments, the compiler/interpreter component 206 compiles (e.g., via a compiler) or interprets (e.g., via an interpreter) the voice assistant runtime software development kit from a source code format to an intermediate code format that is binary. For example, the compiler/interpreter component 206 can be an EMSCRIPTEN compiler. EMSCRIPTEN is a toolchain for compiling any source code to WebAssembly bytecode or a subset of JavaScript, such as asm.js. It is built using LLVC and lets C, C++, and other low-level language on the web execute at near-native speeds without plugins. EMSCRIPTEN thus effectively makes native code immediately available on the web. Using EMSCRIPTEN, particular developers (e.g., using C/C++) do not have the high cost of porting code manually to JavaScript or having to learn JavaScript at all. Accordingly, any portable codebase (whether in JavaScript or not) can be compiled into WebAssembly or asm.js using EMSCRIPTEN.

The audio encoding component 212 encodes voice commands into a format indicated in the voice assistant runtime component 204 and/or the web component 202. This is different than typical encoders that are browser-specific and require encoding in a format that a particular browser supports. Accordingly, regardless of the encoding standards that a particular browser supports, the audio encoding component 212 can communicate with a browser to override or cause the browser to encode in the selected encoding standard.

In some embodiments, the platform abstraction component 208 builds interface layers between the output of the universal application interface component 210 (e.g., WebAssembly bytecode) and web applications/pages, such as the web component 202 (e.g., Javascript) so that web applications/pages can function at near-native runtime (e.g., between 80% and 90% of the speed at which the web component would run had it been locally installed on a device). Alternatively or additionally, in some embodiments the platform abstraction component 208 builds interface layers between other components of a web browser (e.g., Web Audio API, accessibility API (not shown)) in a source language (e.g., JavaScript) and the output of the universal application interface component 210. The platform abstraction component 205 in some embodiments includes APIs that interface with the output of the compiler/interpreter component 206 (e.g., WebAssembly bytecode).

The synchronization component 218 automatically synchronizes web component capabilities or skills with device capabilities skills. This is possible because the same voice assistant runtime component 204 can be used both for a particular device, such as a smart speaker, and a browser or particular application. The synchronization in various embodiments is between the web component 202 and a voice assistant device (which may be different than the user device), such as a smart speaker. Synchronization enables a same set of voice commands to be executed from the voice assistant device and the user device based on the voice assistant device (e.g., a smart speaker) and the user device having the same set of capabilities for the execution of the same set of voice commands. In this way, the synchronization component 218 allows for feature parity between particular hardware devices (e.g., smart speakers) and web applications. In these embodiments, components such as file support (e.g., HTTPFS), adaptive cards, speech, and the like can all be synchronized via one or more APIs.

In an illustrative example, when a user adds (or removes) a skill or capability, the synchronization component 218 provides the added skill to (or disables the removed skill from) device services and web/application servers. For example, a user may have installed a local application within the user device 102A, which allows a user to add, remove, disable, or otherwise manage a skill. The user may add a skill via the application. As a background task, the computing device (e.g., device user device 102*a*, server 106 (FIG. 1), or more generally computing device 800 (FIG. 8)) associated with the application can communicate with one or more other computing devices (e.g., that hosts a web/application server) that provides the web component in order to update the skill capabilities and simultaneously or additionally communicate with a service (e.g., a smart speaker voice assistant service) to update the skill capabilities. For example, the synchronization component 218 can call a service to update the voice assistant runtime component 204 in response to a skill update request. After the update, the service can communicate with a web/application server to update hooked-in voice assistant runtime component 204. In this way, when users access a web component, the most up to date skills can be run on the browser such that the user can issue the associated commands. Accordingly, the voice assistant runtime component 204 may not only be hooked to a particular application (e.g., the web component 202) but the very same component 204 or copy of the component 204 may be stored to a service that causes the hardware device to execute commands.

As described herein, in some embodiments, the system 200 is either built into a web browser or is run on the web browser at a particular point in time, whether in whole or in part. For example, a web browser can contain the universal application interface component 210 and the platform abstraction component 208, which are natively built into the web browser (e.g., they do not require plugins or other porting mechanisms). In various embodiments, only when the web browser requests (in response to a user device request) a web component does it include or run the web component 202 and the voice assistant runtime component 204. For example, the requested web component may be or include the web component 202, which also includes the voice assistant runtime component 204. Responsively, the universal application interface component 210 and the platform abstraction component 208 process or run the web component 202 before the UI component 224 gets rendered or displayed to a user device. Responsively, in some embodiments, the user can then issue a key word for detection and a voice command.

In some embodiments, the web browser additionally includes other components not shown. For example, the web browser can contain a user interface (e.g., an address bar (e.g., containing File, Edit, View, Favorites, Tools, Help functionality), a back/forward button, a bookmarking menu, and the like), all of which can be included in the UI component 224 and/or a rendering engine that displays requested content. For example, if the requested content is HTML, the rendering engine can parse HTML and CSS and display the parsed content on the screen via the UI. The web browser can additionally or alternatively include a browser engine that marshals actions between the UI component 224 and the rendering engine, interpreters (e.g., CCC, DOM, and other interpreters), and/or data storage (e.g., cookies).

Example system 200 also includes storage 225. Storage 225 generally stores information including data, computer instructions (e.g., software program instructions, routines, or services), data structures, and/or models used in embodiments of the technologies described herein.

By way of example and not limitation, data included in storage 225, as well as any user data, may generally be referred to throughout as data. Any such data may be sensed or determined from a sensor (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other records associated with events; or other activity related information) including user activity that occurs over more than one user device, user history, session logs, application data, contacts data, record data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by a sensor component), data derived based on other data (for example, location data that can be derived from Wi-Fi, Cellular network, or IP address data), and nearly any other source of data that may be sensed or determined as described herein. In some respects, date or information (e.g., the requested content) may be provided in user signals. A user signal can be a feed of various data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. Some embodiments of storage 225 may have stored thereon computer logic (not shown) comprising the rules, conditions, associations, classification models, and other criteria to execute the functionality of any of the components, modules, analyzers, generators, and/or engines of systems 200.

Figure 3:
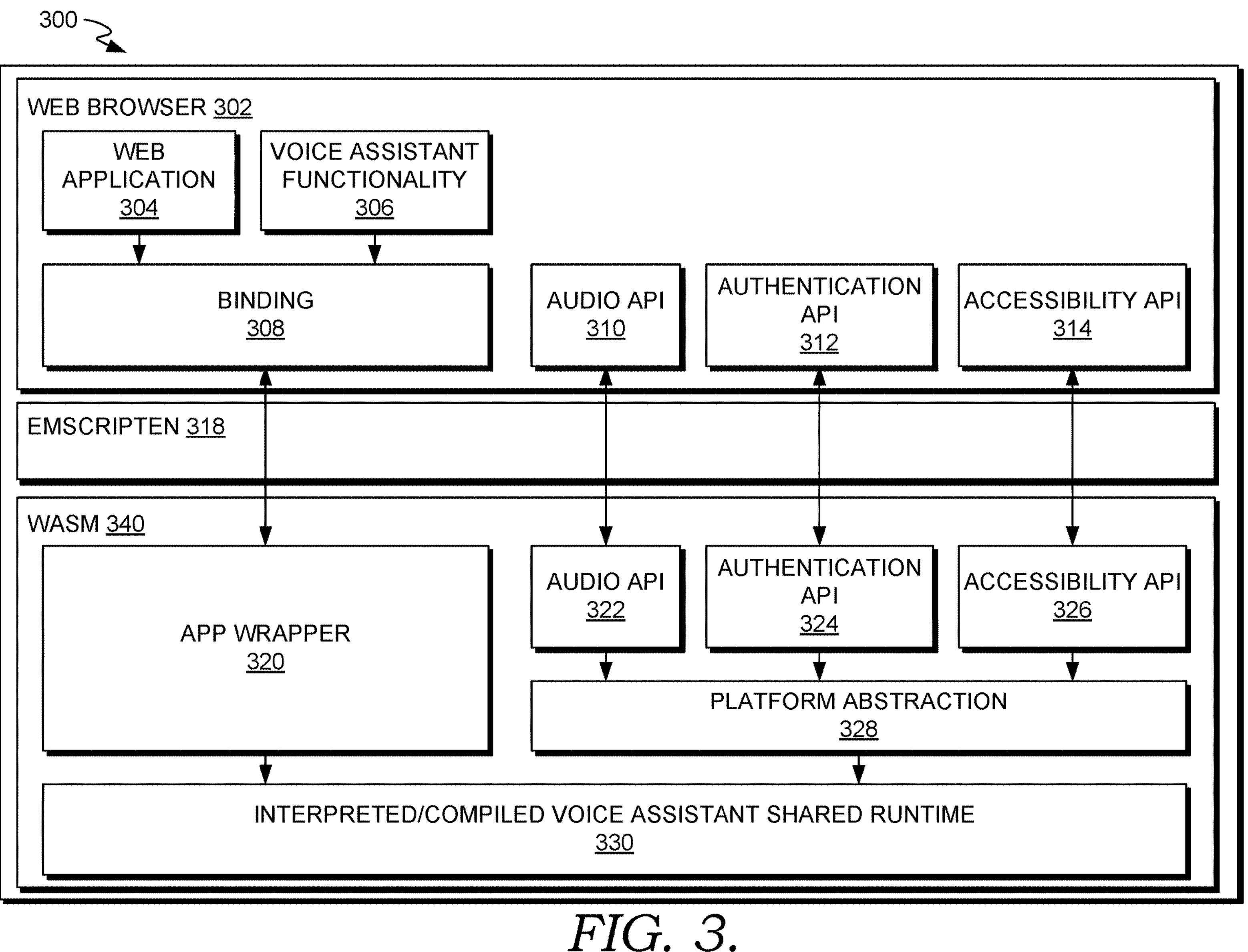
FIG. 3 is a block diagram of a system illustrating how an interpreted/compiled voice assistant shared runtime is generated, in accordance with some embodiments.

FIG. 3 is a block diagram of a system 200 illustrating how an interpreted/compiled voice assistant shared runtime is generated, according to some embodiments. In some embodiments, the functionality described in the system 300, whether in whole or in part, is run by components within the system 200 of FIG. 2, whether in whole or in part. The web browser 302 is a client application that accesses information from the World Wide Web and renders the information to a user device. The web browser 302 or any other web browser described herein can be or include any suitable web browser, such as INTERNET EXPLORER, GOOGLE CHROME, FIREFOX, SAFARI, or any other web browser, including a browser operating on a mobile user device.

The binding 308 binds the web application 304 with the voice assistant functionality 306 (e.g., supported skill identifiers, key word detection functionality, voice encoding functionality, or other functionality). In some embodiments, the binding 308 is or includes the data binding component 222 and vice versa. Likewise, in some embodiments, the web application 304 represents the web component 202 and vice versa. In some embodiments, the voice assistant functionality 306 represents at least a portion of the voice assistant runtime component 204 and vice versa. In particular embodiments, the binding 308 causes the web application 304 and the voice assistant functionality 306 to be hooked together such that when users issue voice commands to manipulate certain web application features, those features can be manipulated via the binding 308. For example, in response to a web browser rendering a web page of a social media web application, the user may issue a voice command saying "voice assistant . . . bring up all posts by Jane Doe . . . " Responsively, the voice assistant functionality 306 (in the APP wrapper 320) can communicate with the web application 304 to cause change in a UI such that all the posts by Jane Doe are displayed.

The audio API 310 is a component of the web browser 302 that processes and synthesizes audio in the web application 304. In some embodiments, the audio API 310 is a web audio API that creates and processes sounds in any web application via a W3 draft standard. For example, the audio API 310 can include audio gain controls (AGC) and echo cancellation (AEC) components that adjust microphone levels and amplify the audio to make a call clear. The audio API 310 (particularly in its WASM 340 form) allows for audio quality that is near-native in execution. That is, the audio API 310 allows for voice detection and encoding capabilities similar to devices (e.g., smart speakers) that have native voice detection and encoding functionality. Accordingly, there need not be an extreme quality tradeoff between using a particular voice assistant device and using the same functionality over the web in particular embodiments.

The authentication API 312 is a component that indicates authentication mechanisms and credentials to use the web application 304 and/or any other web application, such as when a user has subscribed to a service that offers a bundle of web applications for use. For example, the authentication API 312 can be an interface that hooks into Microsoft Account (MSA) and/or Azure Active Directory (AAD). The Accessibility API 314 is a component that defines ways to make web content more accessible for certain groups of people, such as those with disabilities. For example, the accessibility API 314 can be or include an Accessible Rich Internet Application (ARIA) API, which can define ways to make web content written in JavaScript more accessible for people with disabilities. In an example illustration, for the visually impaired, this Accessibility API 314 may cause large print on the display screen or certain content to be delivered via audio instead of textual.

The EMSCRIPTEN compiler 318 compiles each of these components from a source code format into WASM 340 bytecode. It is understood that the EMSCRIPTEN compiler 318 and/or WASM 340 can alternatively be any suitable compiler or intermediate code format, such as the compiling component 206 or intermediate code as described with respect to the universal application interface component 210 respectively. This bytecode is binary in nature and is intermediate level coding. Specifically, the EMSCRIPTEN compiler 318 compiles the web application 304, the voice assistant functionality 306, and the binding 308 into WASM 340, which is wrapped via the APP wrapper 320. In some embodiments, the APP wrapper 320 is an interface layer that allows two or more components that were previously incompatible to become compatible. For example, in an object oriented context, the app wrapper 320 can be a class with a special interface that allows compatibility between other classes corresponding to the web application 304, voice assistant functionality 306, and the binding 308. In this way, these components can seamlessly be called by other functions. In particular embodiments, the APP wrapper 320 includes an API that hides all the complexities of orchestrating service endpoints, optimizing speech interactions, consistent user flows, and the like—that is, all of the complexities of the voice assistant functionality 306 and web application are hidden via the APP wrapper 320.

The EMSCRIPTEN compiler 318 also compiles the audio API 310, the authentication API 312, and the accessibility API into WASM 340, representing the audio API 322, authentication API 324 and the accessibility API 321. The platform abstraction 328 builds interface layers between the audio API 322, the authentication API 324, the accessibility API in compiled WASM 340 format and the interpreted/compiled voice assistant shared runtime 330. In some embodiments, the platform abstraction 328 is written using HTML5/JavaScript bindings, instead of the typical OS layers, such as Linux and Android. The interpreted/compiled voice assistant shared runtime 330 also directly interfaces with the APP wrapper 320. In some embodiments, the interpreted/compiled voice assistant shared runtime 330 represents or is able to communicate with each of the components in FIG. 2 together (i.e., web component 202, databinding component 222, voice assistant runtime component 204, the universal application interface component 210, the platform abstraction component 208, and the synchronization component 218). In some embodiments, the interpreted/compiled voice assistant shared runtime 330 is an interpreted/compiled version of the voice assistant runtime component 204 of FIG. 2.

In some embodiments, the interpreted/compiled voice assistant shared runtime 330 is output that is readable by the web browser 302 such corresponding web components are rendered or displaying via this layer. Each of these components may exist and run on the web browser 302 at different times. For example, at a first time, before a user request for a web component, the web browser may include the audio API 310, the authentication API 312, the accessibility API 314, and EMSCRPTEN 318 (and no other components). A user may open the web browser 302, which is installed on the user device 102*a*. Within a URL field or search engine field the user may input a URL address or search term to request a particular web component, such as the web application 304. The web browser 302 may responsively fetch the requested web application 304. The web application 304 may include the voice assistant functionality 306 and/or binding 308. In response to the web browser 302 fetching the web application and the attached voice assistant functionality 306 and binding 308, it responsively runs these components and the other components via EMSCRIPTEN 318. That is, EMSCRIPTEN 318 then compiles all of the components to WASM 340 as illustrated to arrive at the output of the interpreted/compiled voice assistant shared runtime 330. Responsively, the web browser 302 can present a UI component of the web application 304 (e.g., via CSS, DOM, and UI engine) such that the user interface is embedded within the web browser 302 for the user to view. Accordingly, this system allows for key word detection and voice command encoding abilities in case the user issues a key word and voice command while the web application 304 is open.

Figure 4:
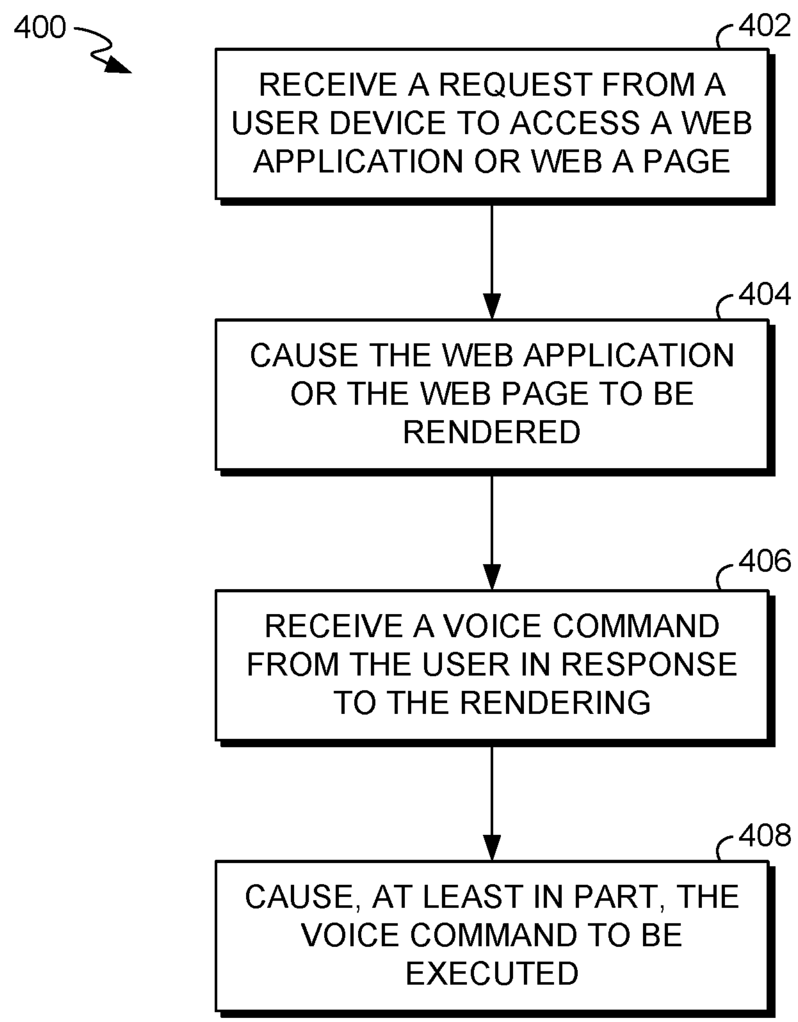
FIG. 4 is a flow diagram of an example process for causing a voice command of a user to be executed via a client application or browser context, in accordance with some embodiments.

FIG. 4 is a flow diagram of an example process 400 for causing a voice command of a user to be executed via a client application or browser context, according to some embodiments. The process 400 (and/or any of the functionality described herein (e.g., process 500)) may be performed by processing logic that comprises hardware (e.g., circuitry, dedicated logic, programmable logic, microcode, and the like), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer program product as described herein may perform or be caused to perform the processes 400 and/or 500 or any other functionality described herein.

Per block 402, a request is received (e.g., by the web browser 302) from a user device (e.g., a user device 102*b*)

to access a web application or web page. The user device is associated with (e.g., is owned or used by) a user. For example, the user may click on or otherwise select a web browser installed on the user device. Responsively, the user may input a URL address or search term to request the web application or web page. Responsively, the web browser may receive this request.

Per block 404, the web application or web page is rendered or caused (e.g., by the web browser 302) to be rendered in response to the receiving of the request from the user device at block 402. In some embodiments, the rendering at block 404 is proceeded by or includes some or each of the functionality as described with respect to FIG. 2 or FIG. 3. For example, a web browser can receive the voice assistant functionality 306, which is hooked into the web application 304, and compile, via EMSCRIPTEN, these components from a source code format (e.g., C) to WASM 340. Additionally or alternatively, block 404 can include using a DOM or CSS interpreter to cause UI components of the web application or web page to be displayed to the user device. Responsively, in some embodiments, the output of the rendering at block 404 is the displayed web page or displayed portion of the web application embedded in the web browser on the user device.

Per block 406, a voice command is received (e.g., by the web browser 302) from the user subsequent to the rendering at block 404. In some embodiments, the voice command is issued by the user without regard to any selections or input by the user on the web application, the web page, and/or the web browser to issue the voice command. For example, the web application or web page does not require a push-to-talk button to activate a microphone for listening to the user command. That is, the user need not select a button or any other component to activate the listening of a device. Rather, the user can state an utterance (e.g., a key word) without any such selection and the system can process the utterance. Alternatively or additionally, in some embodiments the system need not interpret voice commands to issue a request. In these embodiments, the user can type or otherwise input a string for a request (e.g., type the sentence "play song X, by artist Y").

In some embodiments, the receiving of the voice command at block 406 is proceeded by other functionality, such as key word detection. In these embodiments, in response to the rendering at block 404, a voice utterance from the user is detected. In some embodiments, the voice utterance is detected from the user without the user having made a selection (e.g., push a microphone button) to activate the detection. A "voice utterance" may comprise a word (e.g., a "wake word"), phrase, sentence, and/or sound that the system may use as authentication or authorization (e.g., key word detection) to trigger a component (e.g., the audio API 322 and/or associated audio functionality), which is configured to record voice commands of users. For example, the user can state, "voice assistant . . . turn on the lights," where "voice assistant" is the voice utterance and "turn on the lights" is the voice command. In response to the detecting of the voice utterance, the component (e.g., audio API 322) is triggered. The component may be configured to record a given voice command from a user. For example, a logical microphone or other functionality can be initiated to record or listen for sound waves. After receiving the voice command and based at least in part on the triggering of the component, the voice command of the user (e.g., "turn on the lights") is additionally or alternatively encoded. For example, when the user issues the voice command and the component is triggered, the system responsively encodes the voice command. Based on the encoding of the voice command, the voice command is caused to be executed (e.g., block 408) at least in part. That is, in order for encoding or further processing to occur, the component (e.g., microphone) is triggered in particular embodiments. For example, a web browser can transmit the encoded voice command to a service based on triggering the component and receiving a voice command, which then fetches data from one or more services to complete the execution of the request indicated in the voice command.

Per block 408, the voice command is caused, at least in part (e.g., by the web browser 302), to be executed (e.g., answer a question of the user, activate a home device of a user, play music, or perform another command or operation). In some embodiments, the received voice command is encoded or enabled to be encoded into any standard of a plurality of standards for encoding the voice command. In some embodiments, the causing of the voice command to be executed includes using a WebAssembly protocol (e.g., the universal application interface component 210) to encode the voice command in near-real-time in order to transmit the encoded voice command over a network for further processing. For example, the audio encoding component 212 can encode the voice command, which is then transmitted to a NLP service and/or other skill service to execute the command. "Near-real-time" in these contexts corresponds to the time between execution (e.g., the time the voice command was processed, such as the voice assistant uttering back an answer to a question) of the voice command relative to the time the voice command was issued.

In some embodiments, the causing of the voice command to be executed does not require an installation or download of a particular application to the user device. For example, the user need not install any apps that include dedicated voice assistant routines or functionality. As indicated above, some voice assistant systems require users to download or install an app to trigger its functionality. However, web-enabled voice assistant functionality as described herein can be run completely on the web as long a web browser or other client application is stored to the user device.

In some embodiments, the causing of the voice command to be executed includes changing an application page of a web application. For example, a user interface can be displayed to a user device that shows a first view (e.g., a dashboard or landing page). In response to the voice command being received, another view can be displayed (e.g., sub-page of the dashboard). In an illustrative example, the user may issue a voice command while the first view (e.g., inbox email page) is open to perform some function, such as "smart assistant . . . go to my 'junk email'", which causes the junk email entries to be displayed. Alternatively or additionally, in some embodiments the voice command execution includes causing a web application or web page to perform any type of functionality without necessarily changing a page. For example, the user can input a sentence or other character sequence into a text field of the first view. The user may then issue a voice command "voice assistant . . . erase the last two words of the sentence I just typed." Accordingly, the execution may include removing the last two words of the sentence.

In various embodiments, the causing of the voice command to be executed does not require a specific operating system, device, and/or browser. Additionally or alternatively, in some embodiments, the causing of the voice command to be executed does not require an installation or download of a particular application to the user device. As described above, unlike existing technologies, certain components described herein (e.g., the universal application interface component 210) according to certain embodiments, seamlessly plug into any platform via the web so that the user does not have to have a dedicated device, application, or any other platform component.

Figure 5:
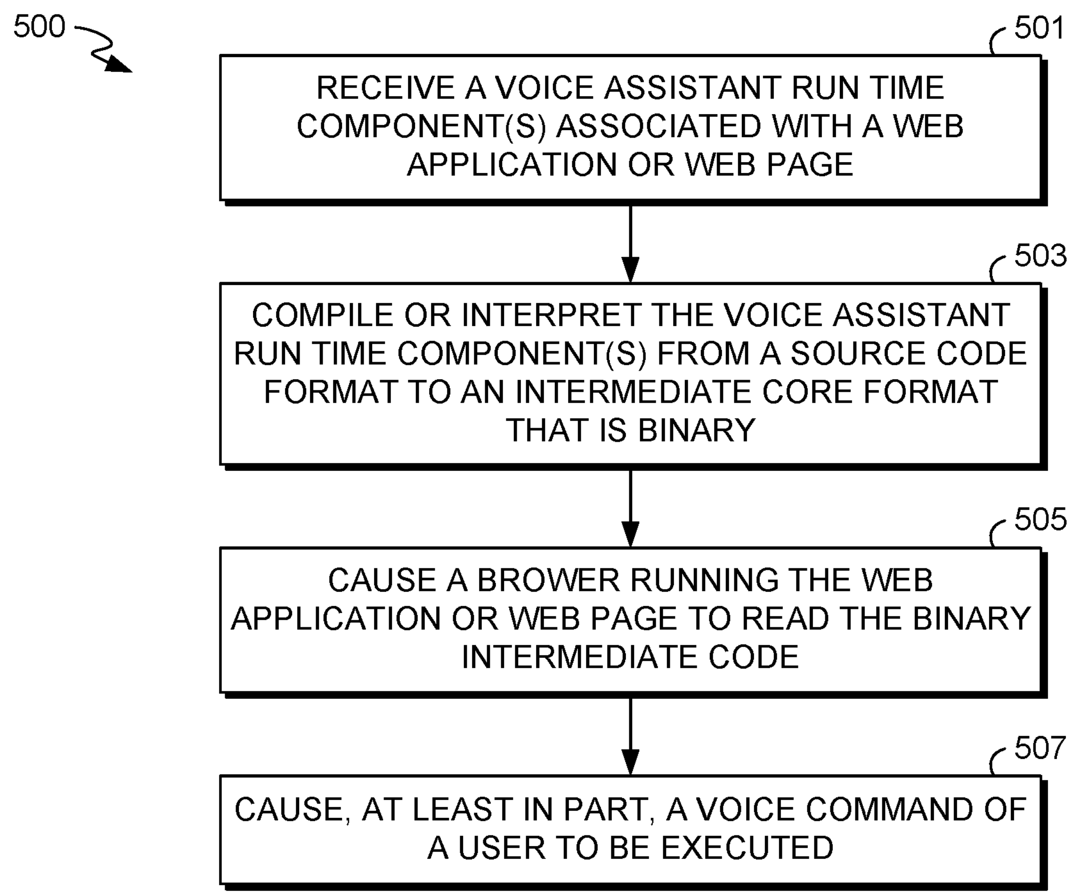
FIG. 5 is a flow diagram of an example process for compiling or interpreting a voice assistant runtime component so that a voice command can be executed, in accordance with some embodiments.

FIG. 5 is a flow diagram of an example process 500 for compiling or interpreting a voice assistant runtime component so that a voice command can be executed, according to some embodiments. In some embodiments, blocks 501 through 503 occur in response to block 402 but prior to block 404 of FIG. 4. In some embodiments, block 507 of FIG. 5 is the same block as block 408 of FIG. 4. Per block 501, a voice assistant runtime component(s) associated with a web application or web page is received (e.g., by the web browser 302). In some embodiments, the voice assistant runtime component(s) includes necessary functionality to execute a voice command. In some embodiments, the receiving of the voice assistant runtime component occurs in response to receiving a request from a user device to access a web application or web page. For example, referring back to FIGS. 4 and 3, in response to a user device issuing a request to access a web application (e.g., the web application 304), the web browser 302 may request the web application from one or more computing devices (e.g., an application server with hooked voice assistant runtime routines), wherein the one or more computing devices receive the request and responsively provide the web application and the voice assistant runtime component(s).

In some embodiments, the voice assistant runtime component(s) and the intermediate code is not written in JavaScript source code or JavaScript bytecode. For example, voice assistant runtime component(s) may be written in C or other low level languages (e.g., C++), as opposed to JavaScript. This is unlike typical web programs, which are written in JavaScript or converted to JavaScript via plugins. In another example, the intermediate code can be WebAssembly bytecode, which is not JavaScript bytecode. This is unlike typical browsers that can only compile or interpret JavaScript source code into JavaScript bytecode. In yet other embodiments, the voice assistant runtime component(s) and/or the intermediate code is not written in assembly language. Assembly language as described herein is a text representation (e.g., SUB, AX, BX), representing an intermediate step between high level source code languages and machine code, which is directly executable by a particular hardware processor. In some embodiments, the intermediate code as described herein is code that is in binary form, as opposed to a text representation that Assembly language is written in.

Per block 503, the voice assistant runtime (e.g., the voice assistant runtime component 204) is compiled (e.g., by the compiling component 206) from a source code format to an intermediate code format that is binary. For example, referring back to FIG. 3, in some embodiments, the EMSCRIPTEN compiler 318 compiles the voice assistant functionality 306 from a source code format (e.g., C language) into WebAssembly. Accordingly, the intermediate code can include WebAssembly bytecode and EMSCRIPTEN can be the compiler that performs the compiling.

Figure 6A:
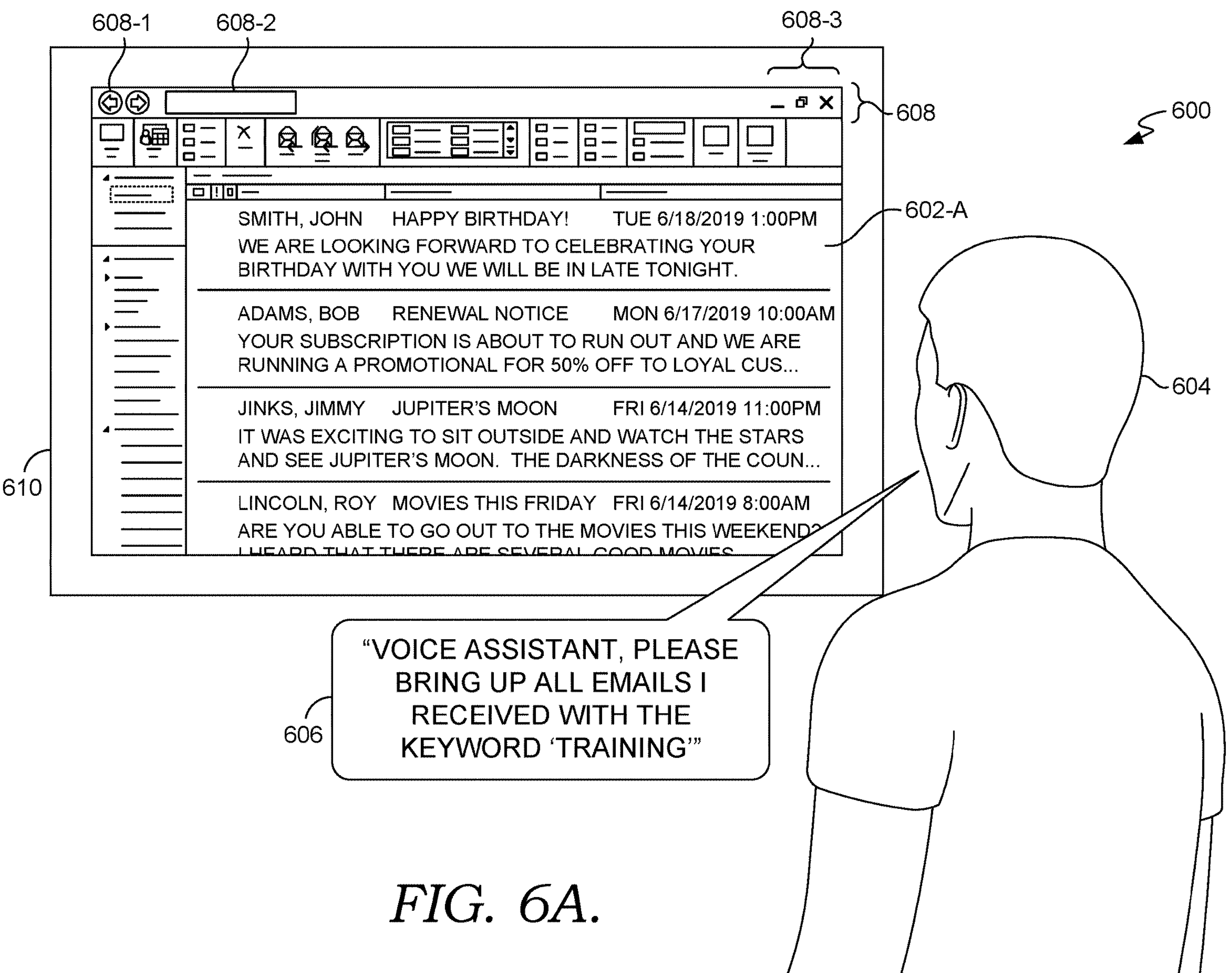
FIG. 6A is a screenshot of a user interface of a web component that has voice assistant capabilities, in accordance with some embodiments.

FIG. 6A is a screenshot 600 of a user interface of a web component that has voice assistant capabilities, according to some embodiments. The screenshot 600 includes the web component 602 (e.g., a UI portion of a web application), which is embedded in the web browser UI elements 608. The web browser UI elements include a page navigator 608-1 (e.g., a backwards/forwards arrow to change to previously-displayed or later-displayed pages), an address field 608-2 to input a URL into, and UI modification elements 608-3, which allow the user 604 to minimize, enlarge, or exit out of a session or web component 602.

At a first time, the user device 610 (e.g., the user device 102*a*) may open a web browser application in response to a user request of the user 604 (e.g., selecting an icon on a desktop). Responsively, the web browser elements 608 are caused to be displayed (e.g., by the one or more user devices 102*a*, or more generally computing device 800) along with a home page. At a second time subsequent to the first time, the user 604 may input a URL address within the element 608-2 and/or input a search term at a search engine interface. In response to receiving this input (e.g., block 402 of FIG. 4), at a third time subsequent to the second time, the web browser application associated with the web browser UI elements 608 sends a request for a page associated with the input (i.e., the web component 602). In some embodiments, at a fourth time subsequent to the third time, the web browser receives the web component 602 and a voice assistant runtime that is hooked into the web component 602 (e.g., block 501 of FIG. 5) and performs various other functionality, such as blocks 503 through 505 of FIG. 5. At a fifth time subsequent to the fourth time, the web component 602A is caused to be rendered (e.g., block 404 of FIG. 4) as indicated in the displayed user interface 600.

In some embodiments, at a sixth time subsequent to the fifth time (in response to the web component 602A being rendered), a user then issues the voice utterance and voice command 606, which reads "Voice assistant, please bring up all emails I have received with the key word 'training'". In some embodiments, the system (e.g., the audio encoding component 212) then receives the voice utterance, detects this key phrase or wake word, and then encodes "please bring up all emails I have received with the key word 'training." In various embodiments, this encoding is then transmitted to one or more other services for further processing. For example, in some embodiments, the encoding is transmitted to a NLP service to interpret or make sense of the voice command and/or another set of services to obtain information associated with the request but that conforms to a skill capability (e.g., contact a web server to retrieve the set of emails that have the key word "training").

Figure 6B:
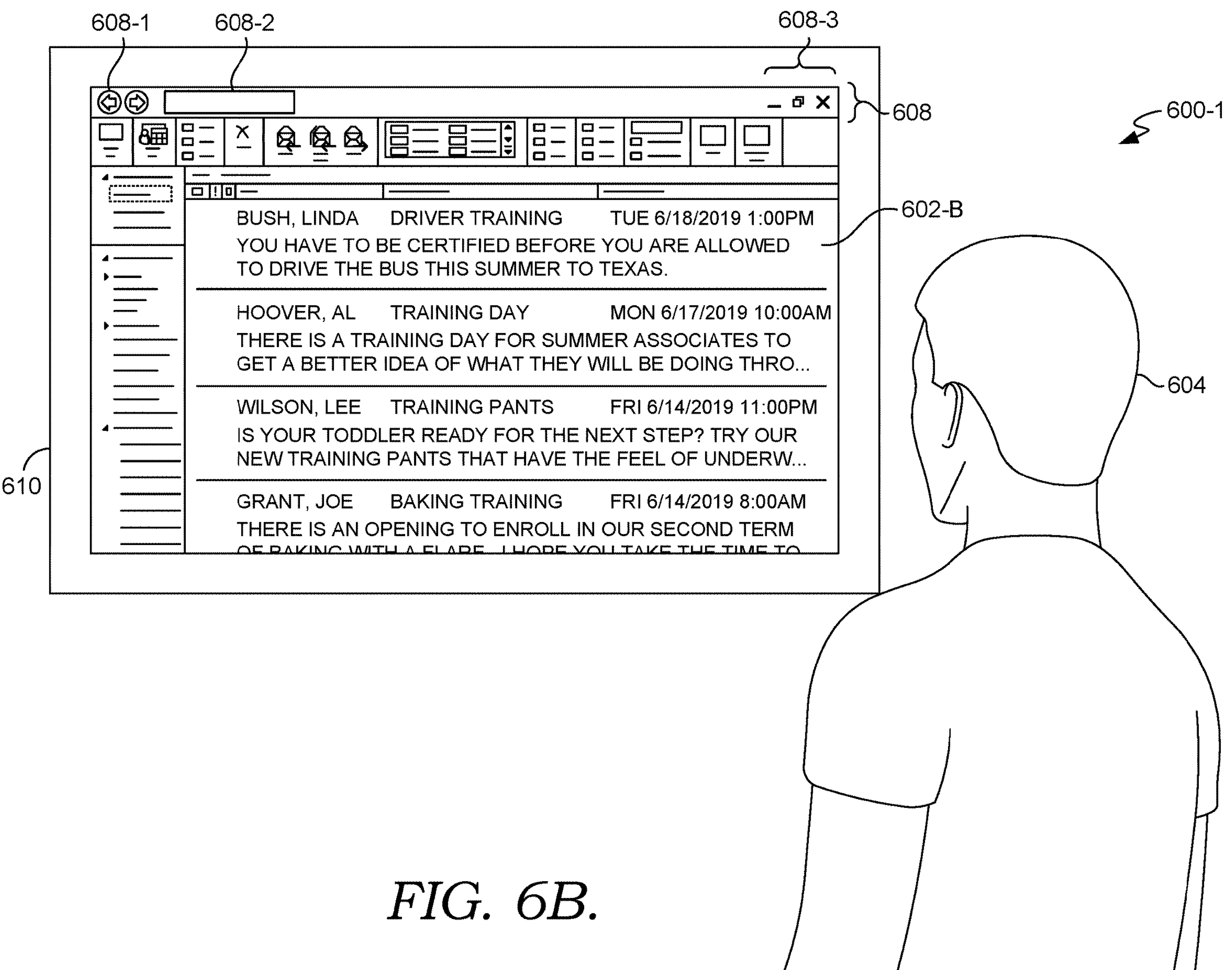
FIG. 6B is a screenshot of a user interface of a web component that is presented in response to a voice command issued by the user while the component of FIG. 6A is displayed, in accordance with some embodiments.

FIG. 6B is a screenshot 600-1 of a user interface of a web component 602B that is presented in response to a voice command issued by the user 604 while the component 602A of FIG. 6A is displayed. In response to the voice command 506 being issued at FIG. 6A, the web browser sends the encoded voice command 506 to one or more services and thereby causes the web component 602 to display all email subject lines with the word "training" in them. FIGS. 6A and 6B illustrates embodiments where voice assistant-enabled web components can be used to modify content that is currently rendered by the client application, such as a web browser changing pages, information, and/or making selections for an existing web application that is displayed.

Figure 7:
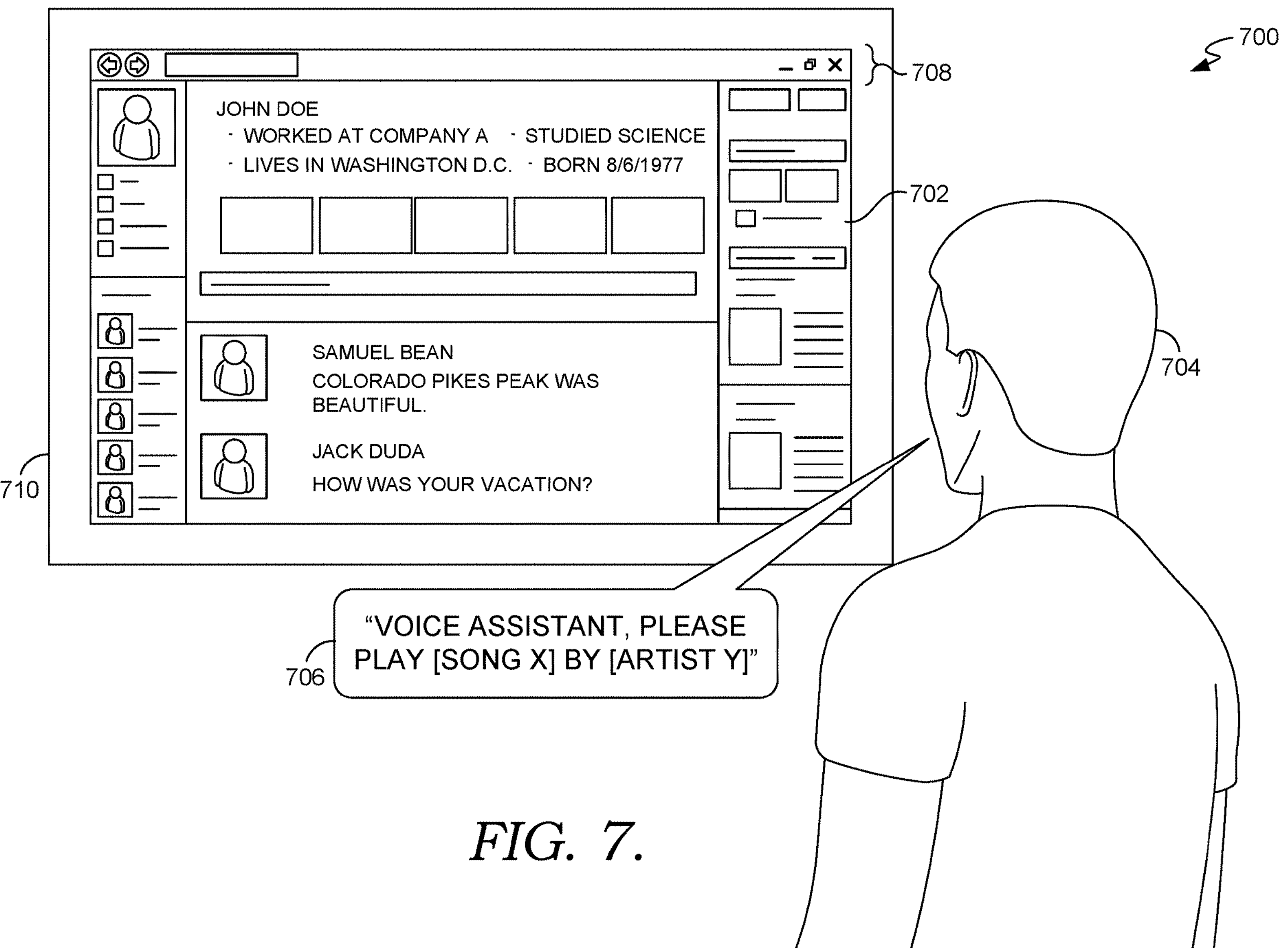
FIG. 7 is a screenshot of a user interface of a web component that has voice assistant capabilities, in accordance with some embodiments.

FIG. 7 is a screenshot 700 of a user interface of a web component that has voice assistant capabilities, according to some embodiments. The screenshot 700 includes the web component 702 (e.g., a UI portion of a web application), which is embedded in the web browser UI elements 708. At a first time, the user device 710 (e.g., the user device 102*a*) may open a web browser application in response to a user request of the user 704. Responsively, the web browser elements 708 are caused to be displayed (e.g., by a user device 102*a*). At a second time subsequent to the first time, the user 704 may input a URL address within the element of the web browser elements 708 and/or input a search term at a search engine interface. In response to receiving this input (e.g., block 402 of FIG. 4), at a third time subsequent to the second time, the web browser application associated with the web browser UI elements 708 sends a request for a page (i.e., the web component 702) associated with the input. In some embodiments, at a fourth time subsequent to the third time, the web browser receives the web component 702 and a voice assistant runtime that is hooked into the web component 702 (e.g., block 501 of FIG. 5) and performs various other functionality, such as blocks 503 through 505 of FIG. 5. At a fifth time subsequent to the fourth time, the web component 702A is caused to be rendered (e.g., block 404 of FIG. 4) as indicated in the displayed user interface 700.

In some embodiments, at a sixth time subsequent to the fifth time (in response to the web component 702A being rendered), a user then issues the voice utterance and voice command 706, which reads "Voice assistant, please play [song X] by [artist Y]". In some embodiments, the system (e.g., the audio encoding component 212) then receives the voice utterance, detects this key phrase, and then encodes "please play [song x] by [artist y]." In various embodiments, this encoding is then transmitted to one or more other services for further processing. For example, in some embodiments, the encoding is transmitted to a NLP service to interpret or make sense of the voice command and/or another set of services to obtain information associated with the request but that conforms to a skill capability (e.g., contact a music service to retrieve the particular song by the artist). FIG. 7 illustrates embodiments where voice assistant-enabled web components can be used to perform voice assistant functionality that is distinct from or unrelated to the web components currently rendered or displayed. This is illustrated in FIG. 7 because a social media page is displayed, but the user 704 has issued a voice command to play a particular song.

Figure 8:
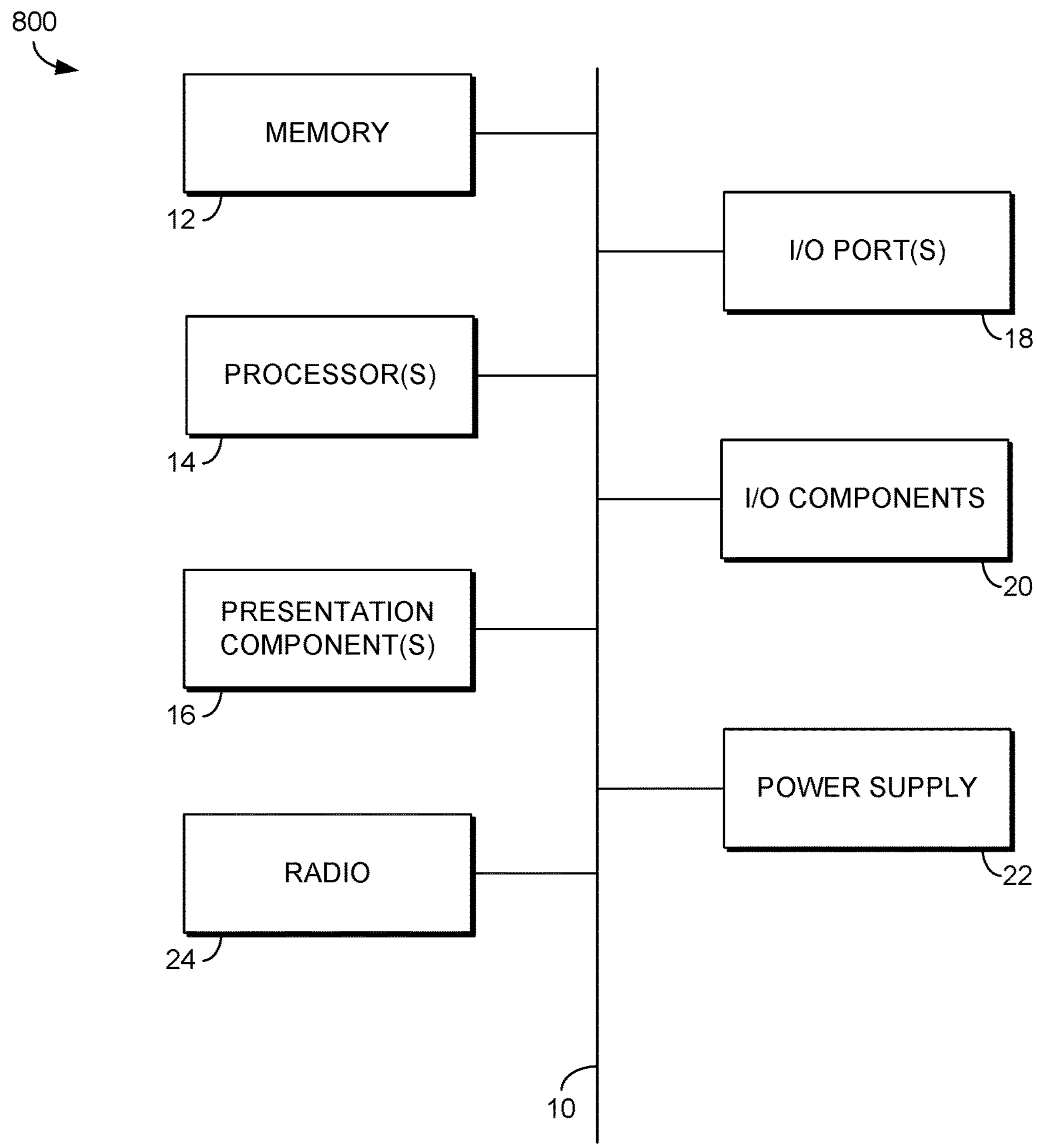
FIG. 8 is a block diagram of an example computing device suitable for use in implementing some embodiments described herein.

Having described various embodiments of the disclosure, an exemplary computing environment suitable for implementing embodiments of the disclosure is now described. With reference to FIG. 8, an exemplary computing device is provided and referred to generally as computing device 800. The computing device 800 is but one example of a suitable computing environment and is not intended to suggest any limitation as to the scope of use or functionality of the disclosure. Neither should the computing device 800 be interpreted as having any dependency or requirement relating to any one or combination of components illustrated.

Embodiments of the disclosure may be described in the general context of computer code or machine-usable instructions, including computer-usable or computer-executable instructions, such as program modules, being executed by a computer or other machine, such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. Accordingly, in some embodiments, computer-executable instructions may include any software, including low level software written in machine code, higher level software such as application software and any combination thereof. In this regard, the system components can manage resources and provide services for system functionality. Any other variations and combinations thereof are contemplated with embodiments of the present disclosure.

With reference to FIG. 8, computing device 800 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more embodiments of the present disclosure. Distinction is not made between such categories as "workstation," "server," "laptop," "handheld device," or other computing device, as all are contemplated within the scope of FIG. 8 and with reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, or other hardware. Computing device 800 includes one or more processors 14 that read data from various entities such as memory 12 or I/O components 20. Presentation component(s) 16 presents data indications to a user or other device. Exemplary presentation components include a display device, speaker, printing component, vibrating component, and the like.

The I/O ports 18 allow computing device 800 to be logically coupled to other devices, including I/O components 20, some of which may be built in. Illustrative components include a microphone, joystick, game pad, satellite dish, scanner, printer, wireless device, and the like. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some embodiments of computing device 800 may include one or more radio(s) 24 (or similar wireless communication components). The radio 24 transmits and receives radio or wireless communications. The computing device 800 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, and the like) can be used in addition to or instead of those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computer-implemented method, comprising:

receiving, by a client application executing on a client device associated with a user, a request to access web content; and in response to receiving the request to access the web content:

rendering, by the client application, the web content in the client application;

compiling or interpreting, by the client application, a voice assistant runtime component;

detecting, by the client application, an indication of a voice command from the user; and upon detecting the indication of the voice command from the user, at the client application, causing the voice command to be executed using the compiled or interpreted voice assistant runtime component.

2. The method of claim 1 wherein causing the voice command to be executed includes encoding the detected voice command and transmitting the encoded voice command over a computer network to a remote server using the compiled or interpreted voice assistant runtime component.

3. The method of claim 1 wherein detecting the indication of the voice command includes activating a voice assistant functionality via the compiled or interpreted voice assistant runtime component for detecting key word/phrase and indicating the voice command is detected upon detecting the key word/phrase.

4. The method of claim 1, further comprising enabling the voice command to be encoded into a standard of a plurality of standards for encoding the voice command.

5. The method of claim 1, further comprising causing synchronization between the client application and a voice assistant device different than the client device, wherein the synchronizing enables a set of voice commands to be executed from the voice assistant device and the client device based on the voice assistant device and the user device having a set of capabilities for execution of the same set of voice commands.

6. The method of claim 1 wherein causing the voice command to be executed includes:

encoding the detected voice command and transmitting the encoded voice command to a remote server that is configured to execute the encoded voice command and generate execution results;

receiving execution results from the remote server; and rendering, by the client application, the execution results received from the remote server.

7. The method of claim 1 wherein causing the voice command to be executed includes encoding the detected voice command and transmitting the encoded voice command to a remote server that is configured to execute the encoded voice command to perform a functionality unrelated to the rendered web content.

8. A computing device, comprising:

a processor; and a memory operatively coupled to the processor, the memory containing instructions executable by the processor to cause the computing device to provide a client application, the memory includes additional instructions executable by the processor to cause the computing device to:

upon receiving, at the client application, a request from a user to access web content, render the web content on a user interface of the computing device;

compiling or interpreting, by the client application, a voice assistant runtime component;

detect, by the client application, a voice command from the user; and upon detecting the voice command from the user, at the client application, cause the voice command to be executed using the compiled or interpreted voice assistant runtime component.

9. The computing device of claim 8 wherein to cause the voice command to be executed includes to transmit encoded voice command over a computer network to a natural language processing service that interprets the encoded voice command.

10. The computing device of claim 8 wherein to detect the indication of the voice command includes to activate a voice assistant functionality via the compiled or interpreted voice assistant runtime component for detecting key word/phrase and indicate the voice command is detected upon detecting the key word/phrase.

11. The computing device of claim 8 wherein the additional instructions are also executed by the processor to cause the computing device to enable the voice command to be encoded into a standard for encoding the voice command.

12. The computing device of claim 8 wherein the additional instructions are also executed by the processor to cause the computing device to cause synchronization between the client application and a smart speaker device, wherein the synchronizing enables a set of voice commands to be executed from the smart speaker device and the computing device based on the smart speaker device and the computing device having a set of capabilities for execution of the same set of voice commands.

13. The computing device of claim 8 wherein to cause the voice command to be executed includes to:

encode the detected voice command and transmitting the encoded voice command to a remote server that is configured to execute the encoded voice command and generate execution results;

receive execution results from the remote server; and render, by the client application, the execution results received from the remote server.

14. The computing device of claim 8 wherein to cause the voice command to be executed includes to encode the detected voice command and transmit the encoded voice command to a remote server that is configured to execute the encoded voice command to perform a functionality unrelated to the rendered web content.

15. A computer-implemented method, comprising:

receiving, by a client application executing on a client device associated with a user, a request to access web content; and in response to receiving the request to access the web content:

receiving data representing a voice assistant runtime component and the web content;

rendering, by the client application, the web content in the client application;

compiling or interpreting the voice assistant runtime component from a source code format to an intermediate code format;

detecting, by the client application, an indication of a voice command from the user; and upon detecting the indication of the voice command from the user, at the client application, causing the voice command to be executed using the compiled or interpreted voice assistant runtime component in the intermediate code format.

16. The method of claim 15 wherein the voice assistant runtime component in the intermediate code format is not written in JavaScript source code, JavaScript bytecode, or an assembly language.

17. The method of claim 15 wherein causing the voice command to be executed includes encoding the detected voice command and transmitting the encoded voice command over a computer network to a remote server using the compiled or interpreted voice assistant runtime component.

18. The method of claim 15, further comprising causing synchronization between the client application and a voice assistant device different than the client device, wherein the synchronizing enables a set of voice commands to be executed from the voice assistant device and the client device based on the voice assistant device and the user device having a set of capabilities for execution of the same set of voice commands.

19. The method of claim 15 wherein causing the voice command to be executed includes:

encoding the detected voice command and transmitting the encoded voice command to a remote server that is configured to execute the encoded voice command and generate execution results;

receiving execution results from the remote server; and rendering, by the client application, the execution results received from the remote server.

20. The method of claim 15 wherein causing the voice command to be executed includes encoding the detected voice command and transmitting the encoded voice command to a remote server that is configured to execute the encoded voice command to perform a functionality unrelated to the rendered web content.

* * * * *